Feb. 17, 1970   F. E. WILEY   3,496,258
METHOD OF POLYMER MOLDING
Filed Aug. 25, 1966   2 Sheets-Sheet 1

INVENTOR.
F.E. WILEY
BY
*Youngs Quigg*
ATTORNEYS

INVENTOR.
F.E. WILEY

United States Patent Office 3,496,258
Patented Feb. 17, 1970

3,496,258
METHOD OF POLYMER MOLDING
Fred E. Wiley, Longmeadow, Mass., assignor to Phillips Petroleum Company, a corporation of Delaware
Continuation-in-part of application Ser. No. 153,355, Nov. 20, 1961. This application Aug. 25, 1966, Ser. No. 575,047
Int. Cl. B29d 23/03; B29c 17/04; B29h 7/02
U.S. Cl. 264—89                    21 Claims

ABSTRACT OF THE DISCLOSURE

Apparatus and method for molding biaxially oriented articles, for example, bottles, comprising heating an elongated crystalline parison to a temperature below the crystalline melting point and while the parison is in the heated condition, stretching it longitudinally and expanding it radially to conform with the shape of the mold cavity. The parison can be formed by extrusion and then cooled until the polymer is in a uniform crystalline condition prior to the heating step so that a continuous operation for making the parison can be obtained. The apparatus comprises an extrusion means, a cooling means, a reheating means, preferably a stretching means and a mold cavity means. The cooling and reheating means can be a sizing sleeve having a means to draw a vacuum between the extruded tube and the walls of the sizing sleeve.

---

Figure 2:
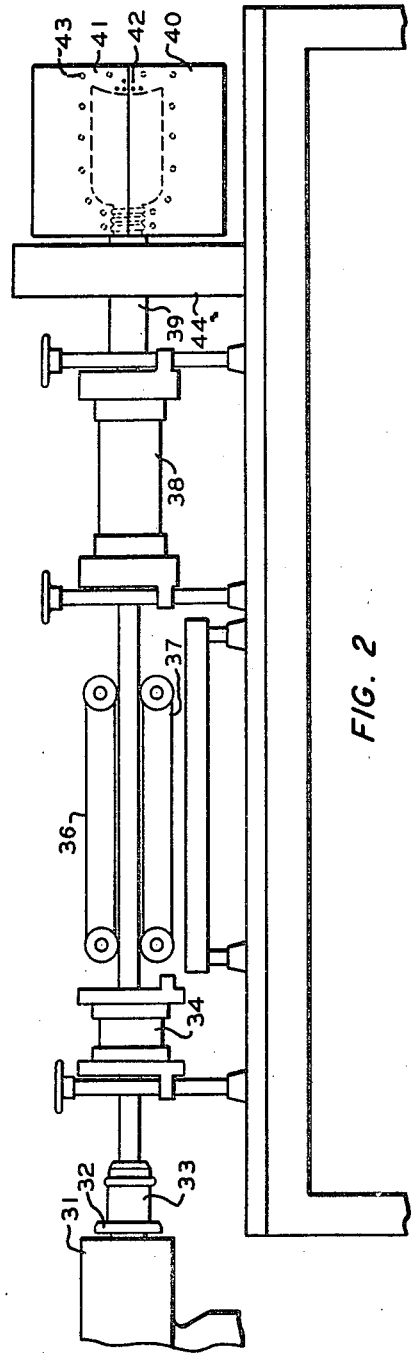

This application is a continuation-in-part of copending application Ser. No. 472,393, filed July 1, 1965, now Patent No. 3,288,317, which is a continuation-in-part of my copending application Ser. No. 153,355, filed Nov. 20, 1961, now abandoned.

This invention relates to a method for conditioning thermoplastic polymer prior to orientation thereof. In another aspect it relates to a method for forming oriented articles of thermoplastic polymer by blow molding. In a further aspect it relates to novel articles formed from oriented thermoplastic polymer. A still further object of this invention is to provide novel articles of oriented polypropylene.

It is well known that many crystallizable thermoplastic polymers such as polyethylene, polypropylene, poly-1-butene, and copolymers of these and higher mono-1-olefins can be strengthened by orientation. This molecular orientation can be brought about by stretching the polymeric structure, preferably biaxially at temperatures below the crystalline melting point of the polymer. While these principles can be readily applied to batch operations, the control of continuous processes to produce molecularly oriented structures is more difficult.

I have discovered a method for the production of uniquely strengthened hollow articles such as bottles, drums, carboys and the like by blow molding after temperature conditioning the polymer which has been extruded in the form of a tube. According to one aspect of my invention I have provided an apparatus for conditioning an extruded tube of thermoplastic polymer prior to orientation thereof. This apparatus comprises an elongated sizing sleeve which can be fastened to the extrusion die from which the tube issues in combination with means for evacuating the space between the extruded tube and the sleeve wall, means for cooling the extruded tube as soon as it enters the sleeve and means for reheating at least the surface of the tube before it leaves the sleeve. This apparatus can be used to provide a conditioned tube which can be oriented by inflation or drawing over an expander ring. The inflation can be continuous as in the production of film or it can be carried out intermittently by expanding a parison contained between mold halves to produce hollow articles.

According to another aspect of my invention the above described temperature conditioning sleeve can be used in combination with bottle molding apparatus. This apparatus combination comprises means for extruding a parison, means for cooling the parison, means for reheating the parison, means for pulling the parison from the reheating means, a plurality of bottle molds positioned to close about successive portions of the heated parison, and means for inflating each parison portion within a mold by internal fluid pressure. According to my invention a method is provided for blow molding hollow articles from thermoplastic crystalline polymer which comprises extruding a parison, cooling the parison until the polymer is in uniform crystalline condition, reheating the parison to within a few degrees below the crystalline melting point of the polymer, passing the parison thus reheated into a mold, and expanding the parison against the wall of the mold by internal fluid pressure. According to a further aspect of my invention I have discovered that hollow articles produced in accordance with the above aspects possess unique and desirable properties when formed from polypropylene.

Figure 1:
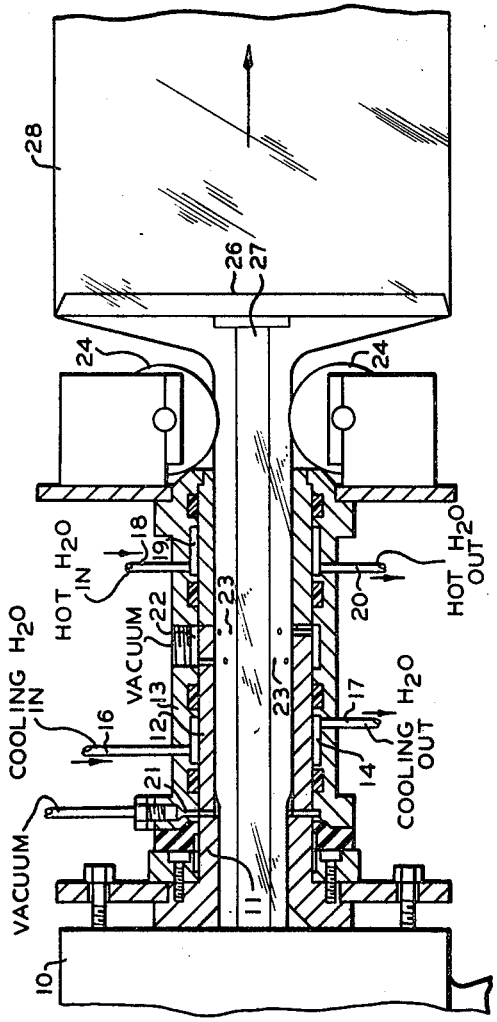
Figure 3:
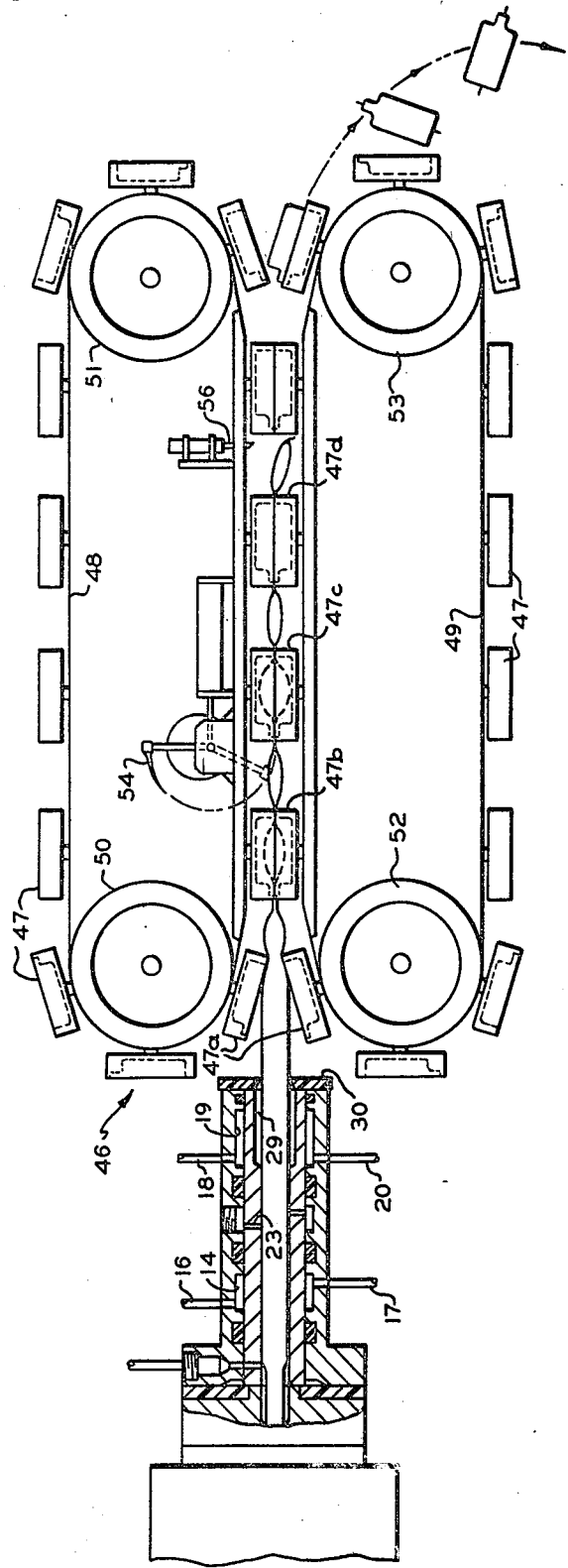

It is an object of my invention to provide method suitable for conditioning an extruded tube of thermoplastic polymer prior to orientation thereof by stretching. Another object of my invention is to provide method for the continuous production of hollow articles by blow molding successive portions of an extruded parison. Still another object of my invention is to provide method by which an extruded parison can be conditioned so that when the parison is subsequently blow molded to form a hollow article a satisfactory seal is produced between the inner portions of the parison which are pressed together while the walls of the parison are substantially strengthened by molecular orientation. Other objects, advantages and features of my invention will be apparent to those skilled in the art from the following discussion and drawings of which FIGURE 1 is an elevation drawing in section of the cooling and reheating sleeve which minimizes sticking of combination with an expander ring for the production of oriented film;

FIGURE 2 is a schematic drawing in elevation of apparatus for temperature conditioning extruded tube and subsequently molding same in the shape of a bottle; and FIGURE 3 is an illustration of a modified form of the cooling and reheating sleeve which minimizes sticking of the tube within the sleeve operating in combination with continuous bottle molding apparatus.

The apparatus and method of my invention can be employed in the fabrication of articles from any thermoplastic polymer which is normally extruded, thermoformed or blow molded, but the invention is of particular advantage with those crystallizable polymers which can be oriented on stretching at carefully controlled temperatures, preferably just below the crystalline melting point of the polymer. Polymers such as polystyrene, polyvinylchloride, nylons and various cellulose derivatives can be fabricated with the apparatus of my invention, but I prefer to work with the normally solid polymers of mono-1-olefins containing up to 8 carbon atoms, and particularly those polymers which have relatively high degrees of crystallinity, for example the high density ethylene polymers and isotactic polypropylene, poly-4-methylpentene-1, polybutene and the like.

I prefer to practice the invention with the olefin polymers having a degree of crystallinity of at least 70 and more preferably at least 80 percent at 25° C. Particularly suitable are the homopolymers of ethylene and copolymers of ethylene with higher mono-1-olefins having a density of about 0.940 to 0.990 gram per cubic centimeter at 25° C.

As used herein the term "density" refers to the weight per unit volume (grams/cubic centimeter) of the polymer at 25° C. The density of polymer should be determined while the sample of the polymer is at thermal and phase equilibrium. In order to insure this equilibrium it is desirable to heat the sample to a temperature 15 to 25 centigrade degrees above its melting point and allow the sample to cool at a rate of about 2 centigrade degrees/minute to the temperature at which the density is to be measured. Any standard method for determining the density of a solid can be used. The crystallinity of the olefin polymers can be determined by X-ray defraction or nuclear magnetic resonance.

Prior to the determination of crystallinity it is desirable that the sample of the polymer be treated for terminal equilibration in a manner described in connection with the density determination. The higher crystalline olefin polymers referred to above do not have a single freezing and melting point but instead have a crystalline freezing point at which maximum crystalline formation occurs upon cooling of the molten polymer and a separate crystalline melting point at which evidence of crystallinity disappears upon heating a sample of the polymer from a cooled crystalline condition. Ordinarily, the latter temperature is several degrees above the crystalline freezing point. The crystalline freezing point of these polymers can be determined by melting a sample of the polymer, inserting a thermocouple in the molten polymer and allowing the polymer to cool slowly. The temperature is recorded and plotted on a chart versus time. The crystalline freezing point is the first plateau in the time-versus-temperature curve. For polyethylene having a density of about 0.960 the crystalline freezing point is about 252° F. The crystalline melting point of these polymers can be determined by freezing a small piece of plastic (usually film) under crossed polaroids in a microscope equipped with means for heating the polymer. The specimen is heated slowly and the melting point is the temperature at which birefringence disappears. For polyethylene having a density of about 0.960 the crystalline melting point is ordinarily about 272° F.

The temperature at which these highly crystalline polymers are stretched is very important if maximum orientation and strengthening of the polymer is to result. For example, it is necessary that polymer be in a substantially crystalline condition, but if the temperature of the polymer is too low the stretching tends to be uneven and the thin wall of the structure which is formed tends to rupture. It is desirable, therefore, that at least a portion of the polymer wall be temperature conditioned so that it is in a crystalline state very near the melting point of the polymer crystallites. Apparatus which can be used to accomplish this temperature conditioning is shown in FIGURE 1.

In FIGURE 1 the crosshead die 10 is equipped with a die tip 11 and the temperature conditioning sleeve is mounted on the die tip so that the tube that is extruded passes immediately into the sleeve. The temperature conditioning sleeve comprises an elongated cylindrical wall section 12 against which the extruded tube is pressed by internal fluid pressure. A jacket 13 completely surrounds the cylindrical wall section and defines between the jacket and the wall section a plurality of annular cavities. One of these annular cavities 14 is disposed in the upstream half of the cooling sleeve toward the extrusion die and communicates through a conduit 16 to a source of cooling liquid. For the extrusion of 1-olefin polymers such as ethylene polymers or polypropylene where extrusion temperatures in the range of about 350 to 400° F. are employed, water at room temperature, e.g., about 70° F., is suitable for this purpose. This cooling water flows through conduit 16, through annular orifice 14 and discharges through conduit 17. This cool water circulating through the upstream end of the cooling sleeve has sufficiently low temperature that at least the surface of the tube as extruded is quenched and the polymer toward the outside of the tube reaches a crystalline state. As the sleeve passes through this quenching section of the sleeve a temperature gradient develops through the thickness of the tube. In order to make the temperature of the tube more uniform the tube is next passed through the downstream end of the conditioning sleeve where the temperature is controlled by a heating fluid which is introduced through conduit 18 and circulates through annular orifice 19 discharging through conduit 20. Hot water under pressure or any other heat transfer medium can be employed for this purpose. For example, when conditioning polyethylene having a density of about 0.960 pressurized water at a temperature of about 235 to 240° F. can be used. Annular cavities 21 and 22 which are provided between the jacket and the inner wall section of the cooling sleeve are connected to means for drawing a vacuum so that the space between the inner wall of the conditioning sleeve and the tube as extruded can be evacuated. As shown in FIGURE 1 the annular cavity 22 communicates to the space between the sleeve and the tube through a plurality of holes 23. These vacuum connections which are located at the upstream end of the conditioning sleeve and at its mid point permit operation of the extrusion and temperature conditioning so that the tube wall is maintained firmly against the inner surface of the conditioning sleeve, thereby improving heat transfer. Other vacuum connections can be provided if desired and one positioned at the extreme downstream end of the conditioning sleeve is very helpful in starting up the operation.

The temperature conditoned tube emerges from the inner wall 12 of the conditioning sleeve and passes between guide rolls 24. The tube can then be stretched outwardly over expander ring 26 which is supported from the crosshead die by shaft 27. The oriented film 28 can be pulled to suitable take-up means not shown. This type of operation can be employed to produce clear, tough polyethylene films at draw down ratios of 10:1 or less. Some clarity has been achieved in films as thick as 5 mils. Very high draw down ratios, e.g., as high as 100:1, can be attained by this method. When operating as shown in FIGURE 1 it is ordinarily desirable to operate at a relatively high temperature but below the sticking point of the polymer. This is particularly true on start-up in order to facilitate stretching the tube over the expander ring. In many instances, however, the desirable stretching temperature is somewhat above the temperature at which polymer sticking develops. In these cases it is desirable to modify the conditioning sleeve as shown in FIGURE 3 by enlarging the inside diameter of the wall section at the downstream end thereof. Since a vacuum tap is not provided at this point the tube does not come into contact with this portion of the inner wall of the conditioning sleeve and the final reheating is carried out by radiation. This section of enlarged diameter is indicated by numeral 29, FIGURE 3. It has also been found that the hot plastic can be passed over a sharp edge, which is preferably made of an insulating material, without sticking at temperatures where sticking would normally occur in contact with a larger surface.

Annular plate 30 is provided, therefore, at the end of the conditioning sleeve as shown in FIGURE 3. This annular plate serves as a guide for the polymer tube as it issues from the conditioning sleeve. Electrical resistance heaters can be used in place of the hot circulating liquid in the downstream section 29 of the conditioning sleeve.

While the apparatus described above is very useful in the conditioning of polymeric tubes which are to be stretched to form oriented films, the apparatus is also quite useful in conditioning parisons to be used for blow molding. In this application the reheating of the extruded tube can be controlled so that the exterior portion of the tube is in a crystalline condition and is strengthened by orientation while the inside of the tube is maintained relatively tacky and in a sealable condition so that when the molds close about the conditioned tube a firm seal is developed between the portion of the tube which is pinched shut. Apparatus which can be used in the formation of strengthened containers formed by blow molding is illustrated in FIGURE 2. The thermoplastic polymer is extruded from crosshead die 31 through die orifice 32 into a sizing and cooling sleeve 33. In this arrangement sleeve 33 does not have the reheating function described in connection with the conditioning sleeve of FIGURES 1 and 3 but instead serves only to quench the extruded tube, or at least the exterior thereof, so that the tube can be passed into water jacket 34 where all the polymer in the tube is brought to a uniform crystalline condition. The tube is then pulled from the water jacket by the continuous belts 36 and 37 and pushed into the heating jacket 38. This heating jacket can comprise a porous bronze sleeve through which high pressure steam is blown or through which a hot heat transfer medium is pumped or it can comprise a bath of heating liquid, for example, ethylene glycol. If a bath of this type is used, pressure is maintained on the ethylene glycol in order to counterbalance any internal pressure held within the tube for blowing the tube downstream of the heating bath. In the heating bath the tube is brought to a temperature within a few degrees, for example, within about 15° F. below the crystalline melting point of the polymer. This is the preferred temperature for orientation in order to achieve maximum strengthening effect.

The heated tube can be further conditioned in a porous sleeve 39 which supports the tube as it passes to bottle mold 40. Bottle mold 40 comprises two mold halves which can be brought together about the heated tube as it passes from the porous sleeve. One end of the tube is pinched shut by the bottom portion 41 of the mold forming the bottom of the bottle. Heating elements 42 can be positioned in this portion of the mold in order to heat the portion of the tube which has been pinched shut, thereby forming an effective seal. The remainder of the mold is cooled by circulating a cool fluid through coils 43. After the mold is closed about the extruded tube, internal gas pressure injected at crosshead die 31 forces the tube out against the walls of the mold forming the bottle. Air ring 44 can be provided surrounding the porous sleeve 39 to aid in further temperature conditioning the tube prior to molding. As an alternative to using pressurized air within the tube, means can be provided within the bottle mold for evacuating the space between the tube and the mold walls, thereby vacuum-forming the conditioned tube within the mold.

FIGURE 3 shows still another embodiment which is preferred for the continuous production of relatively small containers. The extruded tube, properly conditioned within the sleeve as previously described, passees directly to molding apparatus 46 which comprises a plurality of mold halves 47 mounted on continuous belts 48 and 49. Belt 48 is mounted on wheels 50 and 51 while belt 49 is mounted on wheels 52 and 53. As these wheels are rotated the belts move the mold halves 47 into position as shown by mold halves 47a. As these mold halves are brought together they pinch shut a portion of the extruded tube as shown between mold halves 47b. As the closed molds move forward the tube is punctured by needle 54 through which air is injected into the trapped section of the parison as shown between mold halves 47c. The tube is thus forced into conformity with the shape of the mold as shown between mold halves 47d and as the molds move forward the portion of the tube between the molds is severed by knife 56. The mold halves are opened as belts 40 and 49 pass over wheels 51 and 53, respectively, and the molded bottles are ejected from the mold and fall into a receptacle. In the operation of this apparatus it is desirable to move belts 48 and 49 so that when the mold halves come together a pull is exerted on the parison, moving it forward at a rate which is slightly faster than its rate of extrusion. This subjects the conditioned parison to longitudinal tension and develops a longitudinal molecular orientation within the parison prior to molding. This initial longitudinal stretching strengthens the tube so that it is less likely to rupture or form thin spots on blowing. As discussed in connection with FIGURE 2, means can be provided to draw a vacuum between the entrapped parison sections and the walls of the mold halves. The gas pressure present within the tube at the time the molds closed is trapped within the portion of the tube surrounded by the mold so that evacuating the space between the mold and the parison results in that portion of the parison being forced into conformity with the walls of the mold. By a proper combination of these features, sufficient pressure can be maintained continuously within the extruded parison so that only a slight reduction in the pressure within the mold is necessary in order to effect the desired inflation of the parison.

In addition to the continuous temperature conditioning of the parisoin as shown in FIGURE 1, conductive heating of the parison can be carried out wherein there is no relative motion between the parison and the heater by positioning a formed parison in open ended heater 39. After sufficient heating the conditioned parison is removed by grasping and pulling same from the heater or by introduction at the inlet of the heater another parison to be conditioned. This serves to push the conditioned parison out of the heater where it is then picked up and molded in a conventional manner.

By the noncontinuous preconditioning of the hollow parison there is achieved uniform temperatures across the parison wall.

Articles such as bottles formed in accordance with the present invention of oriented polymers of 1-olefins, particularly polypropylene, possess unique properties which in turn enables the articles to be used for many purposes in the art. Such properties include among others orientation release stress, tensile impact strength, and modulus of elasticity in flexure.

The following examples are presented in order to illustrate further the method of my invention:

EXAMPLE I

Polyethylene having a density of 0.960 gram per cubic centimeter at 25° C. is extruded continuously in the form of a parison 2 inches in diameter and 47 mils thick. This tube is passed immediately into a conditioning sleeve as shown in FIGURE 3 where it is immediately quenched by water which is circulating through the jacket of the sleeve at 70° F. The surface of the tube is brought quickly below the sticking temperature and the tube is then reheated to 250° F. in the heating section of the conditioning sleeve. As the tube issues from the sleeve it is stretched longitudinally and then trapped between mold halves which close about the tube completely sealing both ends of the tube which are in the mold. The bottle is then formed by evacuating the space between the mold and the parison causing the parison to be forced into conformity with the mold surfaces. The bottle thus formed possesses molecular orientation within its walls and it is substantially stronger than a bottle formed directly from the hot extruded parison without the temperature conditioning described.

EXAMPLE II

Blow-molded 10-ounce bottles were made from homopolymer polypropylene and from homopolymer linear polyethylene. Extruded parisons from each of the two plastic materials were blow-molded to produce both hot-blown—blow molded from the parison which was in the hot-melt state directly after it came from the extruder—and, oriented—blow molded from parisons that had initially cooled to ambient conditions and were reheated to a temperature slightly below the melting point and then blow molded into bottles.

The following table sets forth the basic extrusion conditions and equipment used:

TABLE I.—PARISON EXTRUSION CONDITIONS

The basic extrusion conditions and equipment used are listed below:
(A) General:
  Extruder, 1½" screw extruder (made by Modern Plastic Machinery Corp., 64 Lakeview Avenue, Clifton, N.J.)
  Die, 90° crosshead die
  Die orifice, 0.417" diameter
  Die tip, 0.323" diameter
  Screw, nylon type

|  | Polypropylene | Polyethylene |
|---|---|---|
| (B) Parisons for oriented bottles: | | |
| Barrel temperature, front | 430° F | 430° F. |
| Barrel temperature, rear | 400° F | 400° F. |
| Die temperature | 390° F | 390° F. |
| Take-off speed | 16 in./min | 19 in./min. |
| Head pressure | 2150 p.s.i | 2600 p.s.i. |
| Internal pressure in parison | 1 p.s.i | 6 p.s.i. |
| Resultant average parison wall thickness | 0.122 in | 0.124 in. |
| Screw speed | 44 r.p.m | 44 r.p.m. |
| Parison cooling | Water cascade | Water cascade. |
| Sizing method | Internal press | Internal press. |
| (C) Parisons for hot-blown bottles: | | |
| Barrel temperature, front | 350° F | 350° F. |
| Barrel temperature, rear | 330° F | 330° F. |
| Die temperature | 360° F | 420° F. |
| Adapter and head | 48% | 43%. |
| Screw speed | 20 r.p.m | 32 r.p.m. |

The following table sets forth the basic conditions for blow-molding the bottles:

TABLE II

Bottle blow-molding conditions and procedures

The basic conditions for blow-molding bottles are as follows:

(A) Hot-blown bottles—
  Parison conditions—as extruded
  Mold assembly—standard Phillips Petroleum Company 10-ounce bottle mold utilizing 6-inch cylinders for closing pressure.
  (1) Polypropylene bottles:
    (a) Parison extruded into mold position and stopped.
    (b) Air flow of 3 c.f.h. applied and closed mold.
    (c) Paused 4 seconds and applied 30 p.s.i.g. for additional 4 seconds.
    (d) Removed bottle and repeated procedure.
    Note.—Mold maintained at room temperature by water cooling.
  (2) Polyethylene bottles:
    (a) Parison extruded into mold position and stopped.
    (b) Air flow of 10 c.f.h. applied and mold closed.
    (c) Paused 1 second and applied 200 p.s.i.g. for additional 4 seconds.
    (d) Removed bottle and repeated procedure.

Note.—Mold maintained at 55° F. by tap water cooling.
(B) Oriented bottles—
  (1) Parison temperature conditioning block:
    Material—aluminum
    Heating method—steam through cored block
    I.D. block—0.865"
    Interior coating—Teflon
  (2) Conditions for preheating and blow-molding:
    Parison length—3 inches
    Mold—standard 10-ounce Phillips Petroleum Company mold
    Parison draw—150%
    Steam pressure on block: Polypropylene, 80 p.s.i.g.; polyethylene, 30 p.s.i.g.
    Parison conditioning time: Polypropylene, 6 minutes; polyethylene, 7 minutes.

Bottles formed under the above conditions were subjected to the following tests for comparative test evaluation:

Tests performed

The tests performed for this comparative test evaluation were as follows:

(A) Molding compound—pellets as received—
  (1) *Flow rate.*—ASTM D1238–62T, 230° C.
    (a) 2160-gram load
    (b) 21,600-gram load
(B) Bottles—test specimens from sidewall—
  (1) *Density.*—ASTM D792–60T, Method A, water immersion.
  (2) *Thickness* of sidewalls of bottles used for testing.
  (3) *Shrinkback.*—Maximum in both principal directions.
  (4) *Orientation release stress.*—Maximum in both principal directions; ASTM D1504–61.
  (5) *Orientation release temperature* at maximum stress in both principal directions; ASTM D1504–61.
  (6) *Tensile impact strength* in both principal directions at 73° F., 40° F., and 0° F.; De Bell & Richardson, Inc., parallel-strip film-impact test, short specimen.
  (7) *Flexural Modulus of Elasticity* in both principal directions; ASTM D790–63.
  (8) *Light transmission.*—ASTM D1003–61, Procedure B (recording spectrophotometer using visual wavelength range of 400–700 millimicrons).
(C) Bottles—as molded—
  (1) *Drop-impact resistance* at 73° F. on all bottle types except oriented polyethylene using a bottom drop, a side drop, and a 45-degree bottom drop. Also, a bottom drop test was performed at 40° F. on all bottle types; ASTM D–20 Committee, Proposed Tentative Method of Test for Measuring the Drop Impact Resistance of Blow-Molded Containers.
  (2) *Water vapor transmission.*—100° F., 90% relative humidity, with desiccant inside bottle.

TABLE III.—SUMMARY OF FLOW RATE TESTS
[ASTM D1238, 230° C., 4-gram charge]

| Material | Flow rate (g./10 min.) | | Extrudate diameter (inches) | |
|---|---|---|---|---|
|  | Avg. | Range | Avg. | Range |
| Polypropylene, Profax 6723: | | | | |
| 2160 g. load | 0.95 | 0.90–1.00 | 0.108 | 0.106–0.109 |
| 21,600 g. load | 127 | 123–131 | | |
| Polyethylene, Marlex 6009: | | | | |
| 2160 g. load | 1.10 | 1.05–1.15 | 0.130 | 0.127–0.132 |
| 21,600 g. load | 98 | 96–99 | | |

TABLE IV.—SUMMARY OF TEST RESULTS ON TEST SAMPLES CUT FROM SIDEWALLS OF BOTTLES

| Property measured | Hot blown polypropylene Avg. | Range | Oriented polypropylene Avg. | Range | Hot blown polyethylene Avg. | Range | Oriented polyethylene Avg. | Range |
|---|---|---|---|---|---|---|---|---|
| Density, 73° F. (g./cc.) | 0.903 | 0.902–0.905 | 0.908 | 0.906–0.908 | 0.946 | 0.946–0.947 | 0.9546 | 0.954–0.957 |
| Wall thickness of bottles used (in.) | 0.014 | 0.011–0.019 | 0.011 | 0.007–0.018 | 0.010 | 0.008–0.013 | 0.007 | 0.006–0.008 |
| Shrinkback, maximum (percent): | | | | | | | | |
|   Circumferential | 6.0 | 1.15 | 37 | 27–45 | 38 | 34–42 | 50 | 44–53 |
|   Axial | 4.0 | 1–10 | 37 | 26–47 | 14 | 10–18 | 54 | 41–63 |
| Orientation release stress, maximum (p.s.i.): | | | | | | | | |
|   Circumferential | 7.8 | 7.5–8.0 | 160 | 135–180 | 1.8 | 1.0–2.6 | 65 | 64–65 |
|   Axial | 2.5 | 1.4–3.5 | 155 | 150–160 | No load | | 52 | 48–65 |
| Orientation release temp. at maximum stress (° F.): | | | | | | | | |
|   Circumferential | 325 | 324–326 | 322 | 311–333 | 286 | 284–288 | 277 | 270–284 |
|   Axial | 344 | 343–345 | 328 | 313–343 | No test | | 282 | 278–284 |
| Tensile impact strength (ft.-lb./in.³) 73° F.: | | | | | | | | |
|   Circumferential | 160 | 130–220 | 780 | 610–870 | 270 | 130–140 | 530 | 250–650 |
|   Axial | 140 | 110–170 | 960 | 770–1140 | 260 | 160–360 | 450 | 420–580 |
| 40° F.: | | | | | | | | |
|   Circumferential | 150 | 130–190 | 890 | 570–1110 | 230 | 150–300 | 400 | 220–570 |
|   Axial | 110 | 60–140 | 1000 | 700–1200 | 200 | 160–280 | 330 | 170–490 |
| 0° F.: | | | | | | | | |
|   Circumferential | 17 | 12–27 | 990 | 840–1200 | 150 | 110–200 | 620 | 450–890 |
|   Axial | 14 | 5–32 | 1,200 | 1100–1300 | 170 | 130–230 | 570 | 420–750 |
| Modulus of elasticity in flexure 10⁵ (p.s.i.) 73° F.: | | | | | | | | |
|   Circumferential | 2.23 | 2.00–2.43 | 3.61 | 3.28–4.21 | 1.42 | 1.16–1.62 | 2.87 | 2.46–2.97 |
|   Axial | 2.65 | 2.37–2.85 | 3.87 | 3.54–4.08 | 2.63 | 2.31–2.92 | 4.04 | 3.61–4.47 |
| Light transmission, visible range* (percent): | (0.0101″ avg. thick.) | | (0.0095″ avg. thick.) | | (0.0092″ avg. thick.) | | (0.0091″ avg. thick.) | |
|   Violet, 400 millimicrons | 57.3 | 56.3–58.3 | 82.3 | 82.0–82.6 | 20.4 | 19.1–21.7 | 39.1 | 38.5–39.7 |
|   Green, 550 millimicrons | 65.1 | 64.2–66.0 | 8.66 | 86.2–87.0 | 26.8 | 25.2–28.4 | 53.8 | 52.9–54.7 |
|   Red, 700 millimicrons | 68.0 | 66.9–69.1 | 87.5 | 86.9–88.1 | 27.1 | 25.1–29.1 | 60.2 | 59.2–61.2 |

*Comparatively, microscope cover glass 0.0085″ thick gives the following transmission: 400 millimicrons, 92.3%; 550 millimicrons, 92.4%; 700 millimicrons, 91.6%.

TABLE VI.—SUMMARY OF TEST RESULTS ON BOTTLES

| Test performed | Hot blown polypropylene | Oriented polypropylene | Hot blown polyethylene | Oriented polyethylene |
|---|---|---|---|---|
| Drop-impact resistance, water filled (ft.) 73° F., bottom drop (10 bottles tested): | | | | |
|   Maximum height for "no failure" | 1.5 | 12 | 2 | |
|   Minimum height for failure | 1.0 | 12 | 1.5 | |
|   Type of failure | (1) (2) | (3) | (2) | |
| 73° F., side drop (10 bottles tested): | | | | |
|   Maximum height for "no failure" | 3 | 12 | 5 | |
|   Minimum height for failure | 3 | 7 | 5 | (4) |
|   Type of failure | (1) (2) | (3) | (1) (2) | |
| 73° F., 45° bottom drop (10 bottles tested): | | | | |
|   Maximum height for "no failure" | 2 | 11 | 7 | |
|   Minimum height for failure | 2 | 8 | 5 | |
|   Type of failure | (1) (2) | (3) | (1) (2) | |
| 40° F. bottom drop (10 bottles tested): | | | | |
|   Maximum height for "no failure" | 0.5 | >12 | 2 | >12 |
|   Minimum height for failure | 0.3 | 12 | 1.5 | 12 |
|   Type of failure | (1) | (3) | (1) (2) | (2) |
| Water vapor transmission, g.-mil/24 h., 100° F., 90% RH, desiccant inside bottle: | | | | |
|   Average | 0.208 | 0.141 | 0.127 | 0.121 |
|   Individual values | 0.207, 0.204, 0.213 | 0.135, 0.160, 0.128 | 0.126, 0.136, 0.120 | 0.127, 0.114 |

¹ Fractured circumferentially around bottom.
² Fractured longitudinally from bottom up.
³ Fractured at nip-off seal on bottom.
⁴ No bottles tested at 73° F.

Examination of the above data clearly demonstrates that:

(1) The processability of the two compounds used in this evaluation is essentially the same. Shear rate—apparent viscosity plots place the two points for each compound on the same curve as that given for Hi-Fax 1400 (Melt Index 0.8 g. 10 min.) in Bernhardt's "Processing of Thermoplastic Materials." At the higher shear rates of normal processing conditions these compounds should show equivalent processability.

(2) Both material types were oriented into bottles at temperatures just below the respective melting points to result in what is considered to be maximum orientation. This orientation was measured by the degree of shrinkback and the orientation release stress to establish the fact that significant orientation has been incorporated into the "oriented" bottles. The orientation in the hot blown bottles is negligible because no significant release stress was obtained even though a fairly high degree of shrinkback was measured in samples from the hot blown polyethylene bottles. This particular shrink-back reflects the normal hot melt memory on recovery characteristics of this linear polyethylene, a phenomenon which is not present in the hot melt of polypropylene. This fact is supported by the extrudate diameters from the flow rate tests, which shows the polyethylene to have a significantly larger diameter (0.130″ vs. 0.108″ for polypropylene).

(3) The impact absorbing qualities in polypropylene is very positively improved by orientation, evidenced by the tensile impact and the bottle drop tests. There is unexpectedly a greater improvement in this respect in the polypropylene than in the polyethylene.

(4) Orientation in polypropylene also creates a toughness that will permit its use at sub-normal temperatures where ordinary unoriented polypropylene could not be used. Essentially the phenomenon of orientation in polypropylene has resulted in the formation of a plastic material significantly different in certain physical and mechanical properties that will allow many applications now not being associated with normal polypropylene.

(5) The clarity of both materials is improved by orientation but the polypropylene has improved as a result of this orientation to a degree that its light transmission in the visible spectrum is approaching that of glass. It is improbable that linear polyethylene will ever approach this degree of clarity regardless of polymer or processing conditions.

(6) Water vapor transmission resistance of the oriented polypropylene bottles is improved over the hot blown bottle to a degree that is considered significant.

The above data was obtained in accordance with the following test procedures. Where applicable, ASTM test procedures were employed. Otherwise strictly comparative testing was performed, using procedures that were technically valid, giving results that would permit a comparison between the samples and bottles tested. Unless otherwise specified, all tests were performed in an environment of 73° F. and 50% relative humidity with preconditioning of at least 24 hours in the same environment just prior to testing.

(A) Flow rate.—Procedures of ASTM D1238 were followed using a temperature of 230° C., a 4-gram charge, and respective weights of 2160 grams and 21,600 grams for the two tests involved. Duplicate tests were performed in each case. The compounds were tested as received in the pellet form. The standard equipment as described in the above ASTM number was utilized with dead weights to apply the load.

(B) Density.—ASTM D792-60T, Method A was used. Distilled water was used as the immersion medium and the test sample consisted of the center main section of a bottle measuring about 2.4 inches in the longitudinal direction, and using the full circumference. A small weight was attached to the test sample to make it sink below the water surface, and a small percentage of wetting agent was added to reduce surface tension. Five determinations were made for each bottle type using five different bottles in each case.

(C) Thickness.—All of the bottles used for this evaluation were checked for profile thickness at three longitudinal points on the bottles. Five measurements were made at each point in the circumferential direction at the center, ¼ inch from the bottom and ¼ inch from the top of the sidewall. A standard machinist's micrometer was used with a ball attachment impinging on the concave surface.

(D) Shrinkback.—All of the bottles used for testing were checked for shrinkback characteristics using individual test specimens cut from each principal direction of the bottle. The De Bell & Richardson, Inc., shrinkback tester was utilized with white mineral oil as the immersion medium. These test samples were exposed for a period of 10 seconds at total immersion at temperatures above the respective melting points. For polyethylene this temperature was 300° F., and for polypropylene it was 340° F.

Temperature tolerance during immersion was ±2° F. It was determined by trial and error testing that 10 seconds was an adequate time for maximum shrinkback to occur in each case. The test samples were ¼ inch wide by 2 inches long. Shrinkback was expressed as the percentage change in length which occurred during this high-temperature immersion. Normally, mineral oil attacks polyethylene and polypropylene, but the time element was too short for this attack to be effective and possibly influence shrinkage characteristics. At least one specimen from each principal direction of each bottle evaluated was tested.

(E) Orientation release stress, maximum.—Orientation release stress in a stretched plastic sheet is the internal stress which remains frozen into the structure of the material after the manufacturing process.

This property was measured using the essential procedures of ASTM D1504-61. The Instron tester was utilized by clamping a parallel-strip, ¼-inch-wide test sample, between tensile jaws and closing the test specimen assembly with a cylindrical heater which was adjusted to give a heating rate of 10° C. per minute. The load imposed by the test specimen was automatically recorded and the maximum load picked from this curve to calculate the maximum orientation stress. Heating rate was controlled manually by adjusting the power input to the cylindrical heater to follow a standard heating curve, which was superimposed on the recording monitor that was activated by a low-inertia thermocouple placed within ⅛ of an inch of the center of the test specimen, but not contacting it. Two determinations were made for each bottle type in each principal direction.

(F) Orientation release temperature at maximum stress.—This property was determined during the above orientation release stress testing. The temperature at maximum stress was determined by picking the temperature off the curve plotted on the temperature recorder at the moment maximum load on the test sample was obtained.

(G) Tensile impact strength.—This property was measured in both principal directions of all bottle types at temperatures of 73° F., 40° F., and 0° F. The test method employed was the De Bell & Richardson, Inc., parallel-strip tensile impact test using the short specimen. Ten determinations were made for each bottle type in each principal direction. A Baldwin impact tester was utilized with liquid $CO_2$ injection to obtain subnormal testing temperatures. The test specimen and jig holding it were entirely enclosed in the removable environmental chamber and both maintained at the test temperature for a period of 3 minutes prior to impacting. Prior to any given test series, the specimen-holding jig was cooled to the approximate temperature of testing.

Temperature control was maintained by manual means, adjusting the input of $CO_2$ coolant to maintain the temperature within ±2° of that desired. Sample size was 2 inches long by ¼ inch wide. Test specimens were carefully prepared by cutting with a new, sharp razor blade and subsequent examination was made of the cut edges under magnification to insure that no edge imperfections were present. All tests used the 4 ft.-lb. capacity impact hammer.

(H) Flexural modulus of elasticity.—The procedures of ASTM D790-63 were followed. Test samples were ¼ inch wide by 1 inch long cut with a razor blade in both principal directions of the bottle. The span was 0.5 inch using a one-point loading and a radius of nose and supports of ⅟₁₆ inch. The Instron tester was utilized for this work, using a load range of 0 to 0.2 pound. A rate of crosshead motion of 0.02 inch per minute was used, and deflection of the test specimen was assumed to be essentially identical to crosshead movement, which was used for calculations. Five determinations were made in each principal direction for each bottle type.

(I) Light transmission.—Light transmission was determined on each bottle type by using test specimens of approximately the same thickness cut directly from the bottle walls. The test apparatus utilized was a Bausch & Lomb recording spectrophotometer (Spectronic 505), using the visible light range from 400–700 millimicrons. Light transmission was expressed as the percentage of light transmitted through the test sample using a reference beam which represented 100 percent transmission. To aid in comparatively judging the test samples, a comparator of microscope cover glass having an approximating thickness relative to the test samples (0.0085 inch) was used. This testing was performed at ambient room conditions with duplicate determinations being made on separate test specimens. The test samples were tested as cut from the bottle with no effort to flatten the samples. Thus the natural curvature of the bottle wall was present during these light transmission tests. The values picked for comparison were those obtained at wavelengths of 400, 550, and 700 millimicrons, respectively representing violet, green, and red.

(J) Bottle-drop testing.—Bottle-drop impact resistance was determined following the essential procedures of an ASTM D20 Committee Proposed Tentative entitled, "Method of Test for Measuring the Drop Impace Resistance of Blow-Molded Containers." This method recommended three types of drops, one on the bottom, one on the side, and a 45-degree angle bottom drop. Ten bottles of each type except the oriented polyethylene were drop-impact tested in each recommended position at 73° F., using water at the test temperature inside the bottle. The oriented polyethylene was eliminated from this test series because of the limited number of bottles available.

The test apparatus for controlling the angle of drop and height consisted of a horizontal trap door arrangement that could be positioned at any height up to 12 feet with a positioning jig which held the bottle in the precise position of drop and a release mechanism that snapped the trap door down and away from the test bottle in such a manner that it allowed the bottle to drop freely without rotation to impact in exactly the same position as that held by the bottle when resting on the horizontal trap door.

Similar testing was performed at 40° F. using only the bottom drop position, and testing all bottle types.

In each of these tests, for each bottle type, ten samples were tested to obtain the minimum breaking height range of each. This failure height range was determined by finding the maximum height at which no fracture occurred and the minimum height at which fracture did occur. The range expressed by these two values is considered to be essentially the minimum failure height range of the bottles. The type of failure in each case was recorded. Each bottle was tightly sealed by a screw cap after completely filling with tap water at the test temperature.

(K) Bottle water vapor transmission.—Water vapor transmission characteristics were determined by exposing the whole bottle to an environment of 100° F. and 90 percent relative humidity using 150 grams of desiccant (calcium sulfate) inside the bottle and checking weight pickup versus time. Three bottles of each type were so evaluated, using weighing techniques as recommended by ASTM E96, with at least three successive daily determinations that resulted in essentially a straight-line plot of moisture pickup versus time. Bottle thicknesses were determined after the test by dissection and micrometer measurements, and this thickness was included in the calculations for water vapor transmission, which were expressed as gram-mil per 24 hours. This thickness consideration in the calculation allowed a direct comparison numerically between bottle types. Bottles were positively sealed under a screw cap using a resilient rubber gasket.

As will be apparent to those skilled in the art, various modifications can be made in my invention without departing from the spirit or the scope thereof.

I claim:

1. A method of blow molding hollow articles from thermoplastic crystallizable polymer of at least one mono-1-olefin containing up to 8 carbon atoms which comprises extruding a parison, cooling the outer surface of said parison until said outer surface of said parison reaches a crystalline state, reheating the outer surface of said parison to bring the polymer toward the outside of said parison a few degrees below the crystalline melting point of the polymer and reduce the rate of heat flow through the parison wall in order to leave the inside of said parison in a tacky, sealable condition, passing the parison thus reheated into a mold, and expanding said parison against the walls of said mold by internal fluid pressure.

2. A method of blow molding bottles from thermoplastic crystallizable polymer of at least one mono-1-olefin containing up to 8 carbon atoms which comprises continuously extruding a parison, quenching the outer surface of said parison to a crystalline condition, quickly reheating the outer surface of said parison to within a few degrees below the crystalline melting point of the polymer and reduced the rate of heat flow through the parison wall in order to leave the inside of said parison in a tacky, sealable condition, closing pairs of mold halves about successive portions of said parison, moving the closed molds away along the line of extrusion at a rate slightly faster than the rate of extrusion thereby imparting a longitudinal stretch to the reheated parison, and inflating each section of parison within its mold by internal fluid pressure.

3. The method of claim 2 wherein gas under pressure is trapped within each parison section about which a pair of mold halves is closed and said section is inflated by evacuating the space between the parison section and the mold wall.

4. A process for producing a biaxially oriented hollow bottle from an elongated crystalline polymeric parison of at elast one mono-1-olefin containing up to 8 carbon atoms comprising heating said parison to at temperature within a few degrees below the crystalline melt point of the polymer, while in said heated condition, longitudinally stretching said parison, placing said stretched and heated parison into molding zone, and expanding said parison to conform to the shape of said molding zone.

5. A method of blow molding a hollow bottle from thermoplastic crystallizable polymer of at least one mono-1-olefin containing up to 8 carbon atoms which comprises forming a parison, cooling said parison until said polymer is in a uniform crystalline condition, reheating said parison to within a few degrees below the crystalline melting point of the polymer, stretching said reheated parison longitudinally, thereafter closing a pair of mold halves about said parison and pinching shut said parison, and expanding said parison against the walls of said mold by internal fluid pressure to form said bottle.

6. The method according to claim 5 wherein said bottle is severed from the remainder of said parison while being held within said mold halves.

7. A process for producing a biaxially oriented hollow bottle from an elongated crystalline polymeric parison of at least one mono-1-olefin containing up to 8 carbon atoms comprising heating said parison to a temperature within a few degrees below the crystalline melt point of the polymer, longitudinally stretching said heated parison, thereafter closing a pair of mold halves about said parison and pinching shut one end of said parison, and expanding said parison against the walls of said mold by internal fluid pressure to form said bottle.

8. The method according to claim 7 wherein said bottle is severed from the remainder of said parison while being held within said mold halves.

9. A method of blow molding a hollow article from thermoplastic crystallizable polymer of at least one mono-1-olefin containing up to 8 carbon atoms, which comprises forming a parison, temperature conditioning said parison so that the exterior portion of said parison is in an orientable crystalline condition and the inside of said parison is in a tacky and sealable condition, stretching said temperature conditioned parison longitudinally, thereafter closing a pair of mold halves about said parison and pinching shut said parison, and expanding said parison against the walls of said mold by internal fluid pressure to form said article.

10. The method according to claim 4 wherein the polymer comprising said polymeric parison is selected from the group consisting of polyethylene and polypropylene.

11. The method according to claim 5 wherein said thermoplastic crystallizable polymer is selected from the group consisting of polyethylene and polypropylene.

12. The method according to claim 7 wherein said polymeric parison is formed from a polymer selected from the group consisting of polyethylene and polypropylene.

13. The method according to claim 9 wherein said thermoplastic crystallizable polymer is selected from the group consisting of polyethylene and polypropylene.

14. A method of blow molding hollow articles from thermoplastic crystallizable polymer which comprises heating a parison of a thermoplastic polymer of at least one mono-1-olefin containing up to 8 carbon atoms while in the solid state to within a few degrees below the crystalline melt point of said polymer, longitudinally stretching said thus heated parison, pinching said parison shut to effect a seal, and expanding said parison against the walls of a mold by internal fluid pressure.

15. A method of blow molding a hollow bottle from thermoplastic crystallizable polymer of at least one mono-1-olefin containing up to 8 carbon atoms which comprises: forming a tubular parison, cooling said parison until said polymer is in a crystalline condition, reheating said parison to within 15° F. below the crystalline melting point of the polymer, stretching said reheated parison longitudinally, therafter closing a pair of mold halves about said parison and pinching shut said parison, and expanding said parison against the walls of said mold by internal fluid pressure to form said bottle.

16. The method according to claim 15 wherein said thermoplastic crystallizable polymer is selected from the group consisting of polyethylene and polypropylene.

17. A process for producing a biaxially oriented hollow bottle from an elongated crystalline polymeric parison of at least one mono-1-olefin containing up to 8 carbon atoms comprising: heating said parison while in the solid state to a temperature within 15° F. below the crystalline melt point of the polymer, longitudinally stretching said heated parison, thereafter closing a pair of mold halves about said parison and pinching shut one end of said parison, and expanding said parison against the walls of said mold by internal fluid pressure to form said bottle.

18. The method according to claim 17 wherein said bottle is severed from the remainder of said parison while being held within said mold halves.

19. The method according to claim 17 wherein said crystalline polymeric parison is formed from a polymer selected from the group consisting of polyethylene and polypropylene.

20. A process for producing a biaxially oriented hollow bottle from an elongated crystalline polymeric parison of at least one mono-1-olefin containing up to 8 carbon atoms comprising: heating said parison to a temperature within 15° F. below the crystalline melt point of said polymer, longitudinally stretching said parison while in said heated condition, placing said thus stretched and heated parison into a molding zone, and expadning said parison to conform to the shape of said molding zone.

21. A method according to claim 20 wherein said crystalline polymeric parison is formed from a polymer selected from the group consisting of polyethylene and polypropylene.

References Cited
UNITED STATES PATENTS

| | | | |
|---|---|---|---|
| 2,919,462 | 1/1960 | Frider | 264—99 |
| 3,079,637 | 3/1963 | Marzillier. | |
| 2,964,795 | 12/1960 | Schaich | 264—99 |
| 3,127,636 | 4/1964 | Heider | 264—98 |

OTHER REFERENCES
"Blow Molding," Jones, pp. 108 and 112, 1961.

ROBERT F. WHITE, Primary Examiner

R. SHEAR, Assistant Examiner

U.S. Cl. X.R.
264—98